3,661,813
POLYOLEFIN FOAM UTILIZING POLYMERIZATION DEACTIVATED CATALYST AND SOLVENT AS NUCLEATING AGENT AND BLOWING AGENT, RESPECTIVELY
Edward W. Cronin, Wilmington, Del., assignor to Hercules Incorporated, Wilmington, Del.
No Drawing. Filed Mar. 26, 1969, Ser. No. 810,793
Int. Cl. C08f 47/10, 29/04, 1/28
U.S. Cl. 260—2.5 HA                12 Claims

ABSTRACT OF THE DISCLOSURE

There is provided a foamed polyolefin product and process for the production thereof. After polymerization of the olefin by a low pressure process, the organo-metallic containing catalysts used in the polymerization process are not completely removed from the polymer. The catalysts are deactivated and, at least in part, function as nucleating agent for foaming. Also, a part of the polymerization solvent is left in the polyolefin and may function, at least in part, as the blowing agent.

---

This invention relates to foamed olefin polymers and to a process for the production thereof. More particularly, the invention relates to foamed olefin polymers which are produced with a polymerization catalyst containing an organo-metallic compound.

Foamed olefin polymers, such as polyethylene and polypropylene, have become important materials in numerous fields of application, such as heat insulators, sound absorbing construction material, and packaging, mainly due to the desirable property of low heat conduction, resiliency, high impact and tear strength as well as ease of production and molding. However, for many applications, these foamed polymers are not attractive due to relative cost of olefin polymer foams as compared to more conventional materials, such as polystyrene foam.

A significant proportion of the cost of olefin polymers results from the necessity of substantially completely removing the organo-metallic containing catalysts used in the "low pressure" polymerization of olefins. Generally speaking, olefins are polymerized by contacting the olefin with a polymerization catalyst comprising a compound of a transition metal of Groups IV, V, VI or VIII of the Periodic Table, or manganese in combination with an organo-metallic compound of an alkali metal, alkaline earth metal, aluminum, zinc, and rare earth metal, and in the presence of an inert organic liquid which is a solvent or diluent, such as a lower alkane. For the purposes of the present disclosure, the above-mentioned combination of the compound of the transition metal and organo-metallic compound of an alkali metal, etc., will be referred to as an "organo-metallic catalyst" and the inert organic liquid which is a solvent or diluent will be referred to simply as a "solvent."

The polymerization is carried out at atmospheric or slightly elevated pressure and at from room temperature to moderately elevated temperature. The polymerization process is well known in the art and more fully explained in U.S. Pats. Nos. 3,051,690; 3,112,300; 3,112,301 and 3,141,872; which disclosures are hereby incorporated by reference. After polymerization, the catalyst is deactivated (killed) by any one of a number of processes known to the art, such as treating the polymer-catalyst slurry with a lower aliphatic alcohol such as methanol, ethanol, propanol, isopropanol, etc., water and amines. For further details concerning various methods known to the art for deactivating the catalysts, see U.S. Pats. Nos. 2,845,412; 2,880,121; 2,900,373 and 2,905,659; which disclosures are incorporated herein by reference. After the catalyst is killed, great effort and expense is required to remove the deactivated catalyst from the polymer. Many processes have been proposed to accomplish the removal of the catalyst, such as by multiple washings with various hydrocarbon solvents, alcohols and alcoholates. Alternately, the polymers are steam treated and/or dissolved in a solvent and treated with an immiscible catalyst extractant. Also, it is known to reflux the polymer with alkali metal alkoxides and to react the polymers with aqueous dispersions of colloidal hydrated silica. The processes used to remove the deactivated catalyst usually entail expensive processing equipment such as filters, wash vessels, solvent recovery distillation apparatus, hold tanks, driers, etc. A significant portion of the cost of producing polyolefins by such processes is a direct result of the necessity of removing the deactivated catalyst. The extensive effort and expense to removing the deactivated catalyst has been universally justified by the art since the polyolefins having the killed catalyst residues therein will undergo degradation and discoloration when heated. Furthermore, the catalyst residue is corrosive and will quickly corrode molds, dies and other shaping devices, rendering them totally unacceptable for commercial fabrication and molding.

As disclosed in U.S. Pat. No. 2,827,445, which disclosure is incorporated herein by reference, the earlier techniques of removing the catalysts were only partially successful and resulted in polyolefins having as much as 2000 p.p.m. of catalysts therein and a residual catalyst content of 50 p.p.m. was considered to be very good. These higher amounts of catalysts in the polyolefin were considered to impart undesirable properties to the polyolefin and a great deal of research has been performed to reduce the amount of catalysts therein. With improved processes, the amount of catalysts remaining in the polyolefin of present commercially available materials is no more than 0.03% (300 p.p.m.) and most polyolefins have considerably less catalysts remaining therein. However, the processes for reducing the amount of catalysts, as now practiced by the art, are quite expensive and the cost thereof is reflected in the price of the marketed polyolefins.

Also, in connection with the production of olefin polymers, after the deactivated catalyst is removed, the organic liquid used in the polymerization process must be substantially completely removed from the polymer. If significant amounts of the inert organic liquid, referred to hereinafter as a solvent, remains in the polymer, upon vaporization during shaping, such as molding or extruding at elevated temperature, the shaped product is spoiled due to gas bubbles therein and the extrusion may become discontinuous. Accordingly a great deal of effort and expense is necessary to remove solvent from the olefin polymers.

Recently, efforts have been made to produce olefinic polymer foams utilizing polymers produced by less expensive processes than those described above. A notable example of such efforts is disclosed in U.S. Pat. No. 3,275,577 to Hoeg et al. According to that patent it was found that propylene and butene-1 could be polymerized in a batch operation under pressure with a conversion of up to about 75% by weight of the monomers by carefully controlling the polymerization conditions. Further, it is disclosed that upon venting the reactor to the atmosphere, the remaining monomer would foam the propylene-butene-1 copolymers. It is further suggested in that patent that the reacted copolymer and remaining monomer could be passed through an extrusion die and allowed to foam during such passage, hence producing a shaped product. As will be appreciated by those skilled in the art, such a process is not commercially practical, since it requires a batch polymerization of specific materials and the use of an extrusion die operated in conjunction with the polymerization vessel.

It is therefore an object of the present invention to provide a foamed polyolefin which is relatively inexpensive. It is a further object to provide shaped foamed products from inexpensive polyolefins, which shaping may be accomplished with any of the known shaping processes and whenever desired. It is another object to provide foamed polyolefins which will not substantially degradate or further discolor. It is also an important object to provide foamed polyolefins which have exceptionally uniform and small foam cells. It is a further object to provide processes for producing the above product. Other objects will be apparent from the following description of the invention and attached claims.

It has now been found that olefin polymers which have been polymerized with an organo-metallic containing catalyst, as described above, may be foamed without removing the deactivated catalyst. Further, it has been found that the deactivated catalyst functions as an excellent nucleating agent and produces an exceptionally uniform and small celled foam. It has further been found that it is not necessary to completely remove the inert organic liquid solvent used in polymerizing olefin polymer.

When up to 10%, preferably between 1% and 6% of the solvent remains in the polymer, the solvent functions as an excellent foaming agent when heated to a temperature sufficient to vaporize the solvent and foam the polymer, e.g., from about 190° F. to 400° F., preferably from about 250° F. to 330° F. As will be appreciated, the above discoveries allow the use of an inexpensive olefin polymer in the production of foams thereof, since the expense related to the removal of the deactivated catalysts and the solvents used in the polymerization is substantially lowered. Further, the present invention does not require the addition of further nucleating or foaming agents to the polyolefins, as required by the prior art, or the necessity of mixing to disperse the nucleating and foaming agents. Also, by the nature of the polymerized polyolefins, the deactivated catalysts and solvents are inherently uniformly and finely dispersed in the polymer which, therefore, provides foams of uniformly dispersed small cells.

Preferably, the polymer containing the catalyst is treated with a basic solution, e.g., an aqueous or organic solution of a base, either after the catalyst is deactivated in a conventional manner or by using the basic solution to deactivate the catalyst. The purpose of the treatment is to neutralize the acid residues of the catalyst thereby preventing substantial dgradation and discoloration of the resulting foam. While any basic solution may be used, organic solvents having alkali metal, hydroxides or alkaline earth metal hydroxides dissolved therein are preferred. Acceptable organic solvents include the lower alkanols. The bases preferred are the hydroxides of the alkali metals, such as sodium and potassium, since the neutralized residues are present as the oxides, and as such become very excellent nucleating agents. The amount of the basic solution used is not critical and need be only sufficient to neutralize the catalysts. The specific amount can be determined by mixing increasing amounts of the basic solution with the polymer until the mixture becomes neutral. Of course, excess amounts of the solution may be used if desired.

The foams of the present invention may be of any of the known polyolefins polymerized from the lower mono-olefins, especially those having from 2 to 10 carbon atoms, e.g., ethylene, propylene, butene, pentene, hexene, octene, and decene and mixtures thereof. Particulary important are the polymers of ethylene, propylene and 1-butene.

The term "deactivated (killed) catalysts" means deactivated organo-metallic containing catalysts and the deactivation products which will no longer sustain polymerization of olefins. The organometallic containing catalysts comprise transition metal compounds and organo-metallic compounds usually in an inert organic diluent. The transition metal compound may be a compound of any metal of Groups IV–B, V–B, VI–B or VIII or the Periodic Table, i.e., titanium, zirconium, hafnium, thorium, vanadium, columbium, tantalum, chromium, molybdenum, tungsten, uranium, iron, cobalt, nickel, etc., or manganese. The compound may be of an inorganic salt such as a halide, oxyhalide, etc., or an organic salt or complex such as an acetylacetonate, etc. Especially notable are the metal halides such as titanium tetrachloride. Exemplary of the transition metal compounds that may be used are titanium and zirconium tetrachloride, manganous chloride, nickelous chloride, ferrous chloride, ferric chloride, tetrabutyl titanate, zirconium acetylacetonate, vanadium oxy acetylacetonate, chromium acetylacetonate, etc. The organo-metallic compound that is reacted with one of the transition metal compounds or mixtures thereof may be an organo compound of an alkali metal, alkaline earth metal, aluminum, zinc, earth metal, or rare earth metal, as for example, alkali metal alkyls or aryls such as butyl-lithium, amylsodium, phenylsodium, etc., dimethylmagnesium, diethylmagnesium, diethylzinc, butylmagnesium chloride, phenylmagnesium bromide, triethylaluminum, tripropylaluminum, triisobutylaluminum, trioctylaluminum, tridodecylaluminum, dimethylaluminum chloride, diethylaluminum bromide, diethylaluminum chloride, ethylaluminum dichloride, the equimolar mixture of the latter two known as aluminum sesquichloride, dipropylaluminum fluoride, diisobutylaluminum fluoride, diethyl aluminum hydride, ethylaluminum dihydride, diisobutylaluminum hydride etc., and complexes of such organometallic compounds, as for example, sodium aluminum tetraethyl, lithium aluminum tetraoctyl, etc. In general the molar ratio of organo-metallic compound to transition metal compound will be from about 0.1:1 to 100:1 and more usually will be from about 0.3:1 to 10:1.

Accordingly, the present invention provides a uniformly dispersed, small cell, foamed polyolefin which comprises the polyolefin and a nucleating agent, wherein the polyolefin is the product of polymerization of an olefin in the presence of an organo-metallic catalyst and the nucleating agent is, at least in part, the residue of the organo-metallic catalyst associated with the polyolefin after polymerization thereof, and wherein the amount of the catalyst residue in the polyolefin is sufficient to accomplish nucleation. The amount of catalyst residue required to accomplish nucleation will, of course, vary with the particular blowing agent as well as the blowing temperature. Under most circumstances, about 0.20% will be required. However, the amount may be from about 0.07% to 1% and preferably 0.07% to 0.6% by weight of the polyolefin. The upper amount of catalyst remaining in the polyolefin is not narrowly critical. However, little additional advantage is found with more than 1% of the catalyst remaining in the polyolefin.

As further features of the invention, there is provided a foamed polyolefin having small and uniformly dispersed cells produced from a polyolefin, which polyolefin is the product of polymerization of an olefin in the presence of an organo-metallic containing catalyst and in the presence of a polymerization solvent, and wherein the said polymerization catalyst has been deactivated; an improvement resides in the use of a nucleating agent which comprises the deactivated catalyst associated in the polymer after polymerization, and the use of a foaming agent which comprises the inert organic solvent associated in the polymer after polymerization, and especially when the amount of the solvent is from about 1% up to about 10% by weight of the polymer.

Of course, if desired, additional conventional nucleating and/or foaming agents along with conventional antioxidants, stabilizers, plasticizers, fire retardants, coloring and dyeing compositions may be added to the polyolefin either prior to, during, or after foaming, in manners well known to the art, e.g., chlorinated resin/ antimony oxide, organic phosphates (fire retardants), ZnO, TiO$_2$, phthalocyanin blue and green (pigments and dyers), dilauryl thiodipropionic acid, Dalpac, Toponol CA, Santanox (antioxidants and stabilizers), dioctyl adipate, dioctyl phthalate (plasticizers), Kempore 125, Celogen AZ, pentane, Freon (blowing agents), and calcium stearate, zinc stearate, stearic acid and microcrystalline wax (lubricants).

While any conventional polymerization process for producing polyolefins with an organo-metallic catalyst will result in a polymer having more than enough killed catalysts to effectively function as the sole nucleating agent for the foam, generally speaking, the polyolefin should have about at least 0.07% of the deactivated catalysts calculated as ash weight percent and could be as much as 1% or more, but preferably 0.07% to 0.6%.

As mentioned above, any conventional inert organic solvents used in conventional olefin polymerization may serve as the foaming agent, since substatnially all will vaporize at or below the softening point of polyolefins. However, particularly suitable are the lower alkanes and cycloalkanes, i.e., up to 12 carbon atoms, and the alkyl and halo substituted lower alkanes, i.e., propane, pentane, hexane, octane, decane, dodecane, methyl pentane, dimethylbutane, bromopropane, ethyl chloride, cyclohexane and cyclopentane. Also suitable are aromatic hydrocarbons and the halogenated aromatic hydrocarbons, e.g., benzene, toluene, xylene, chlorobenzenes and chloronaphthalenes.

For more details concerning suitable catalysts, solvents and diluents, as well as polymerization conditions, see the above-mentioned U.S. patents, as well as U.S. Pats. Nos. 2,886,561 and 3,268,498, which disclosures are incorporated herein by reference.

The polyolefins may be of any desired average molecular weight, but the lower molecular weight polymers are preferred, e.g., those having melt indexes ($I_2$) of between about 0.1 and 15. These polymers produce exceedingly uniformly dispersed and small cells as well as being easily shaped or extruded and have a soft feel.

The invention will be illustrated by the following examples of specific embodiments, but it is to be understood that the examples are equally applicable to all embodiments of the invention as embraced by the spirit and scope of the annexed claims. In the examples, all percentages and parts are by weight unless otherwise specified.

EXAMPLE 1

There was prepared a sample of polyethylene by charging to a vessel 33 parts of n-heptane, replacing the air in the polymerization vessel with nitrogen, evacuating, adding 1.9 parts of ethylene, and after equalizing the temperature of the polymerization vessel at 30° C. adding a catalyst of aluminum alkyl and a titanium component. The catalyst system used was a hydrocarbon-insoluble reaction product of triethylaluminum and titanium tetrachloride used in conjunction with an additional 0.06 part of triethylaluminum. The hydrocarbon-insoluble reaction product used was prepared by mixing 0.03 part of triethylaluminum with 0.05 part of titanium tetrachloride (molar ratio of 1:1) in 1.4 parts of n-heptane, aging 2 hours at room temperature, filtering off the precipitate, washing the precipitate twice with n-heptane, and resuspending it in n-heptane. The suspension in n-heptane and the aluminum alkyl used in conjunction therewith was then added to the polymerization vessel as described above. The pressure in the vessel was 67 pounds per square inch absolute. The reaction was continued for 15 minutes and accomplished about a 100 percent conversion of the ethylene and a polymer with a Reduced Specific Viscosity of 9.5 was produced. Reduced Specific Viscosity means the $\eta_{sp/c}$ determined on a 0.1% solution (0.1 g. of the polymer per 100 ml. of solution) of the polymer.

When the polymerization was substantially complete the reaction mixture was separated into three equal portions. To portions A and B there was added 40 parts of a saturated solution of sodium hydroxide in butanol to stop the reaction and kill the catalyst. The sodium hydroxide solution also neutralized the acidic components of the reaction mixture and precipitated all metals of the system as hydroxides. To portion C there was added 4 parts of butanol to stop the reaction and kill the catalyst. Sample C was filtered to recover the precipitated polymer, which was then washed twice in n-heptane, twice with absolute ethanol, refluxed for 15 minutes with 40 parts of a 10% methanolic solution of hydrogen chloride, filtered and washed with methanol until the filtrate was acid-free. The washed polymer was subsequently dried for 4 hours at 80° C. in vacuo. Samples A and B were filtered to recover the polymer. Sample A was dried in vacuo at 80° C. until the polymer contained approximately 10% of the diluent, n-hexane, used in the polymerization while Sample B was dried in vacuo at 80° C. for 4 hours. Samples B and C had approximately 0.08% by weight of n-hexane contained therein. Sample C had an ash content of about 0.02% while Samples A and B had an ash content of about 0.25%.

Each of the samples were extruded with a 2½ inch, 24:1 $L/D$ Prodex extruder with a vented metering screw and having a 26 inch long heat exchanger/mixer and a 3½ inch diameter oil heated annular die. The samples were mixed with .25% zinc stearate and 0.15% propylene oxide prior to extruding. The temperatures along the extruder barrel varied from 290° F. to 335° F. with a die face of about 345° F. The extruder was operated at about 80 r.p.m.'s and at a rate of about 80 pounds per hour. Sample A produced a uniformly dispersed small cell foam with no collapse of the cells. Samples B and C produced no foam at all.

As can be seen from the above, the process of the present invention produces a good quality polyolefin foam utilizing the deactivated catalysts and residual polymerization solvent as nucleating agents and blowing agents respectively.

EXAMPLE 2

In order to test the process on commercially manufactured polyethylene, three samples of polyethylene produced in a commercial operation were obtained. Sample A-2 was the standard product produced in a commercial plant except that the deactivated catalyst residues and polymerization solvent had not been removed completely. Sample B-2 was also a commercial product except that the polymerization solvent had been substantially removed. Sample C-2 was also a commercial product and had been completely processed with substantially all the deactivated catalysts and polymerization solvents removed. The three samples had the following analysis:

| Sample | A-2 | B-2 | C-2 |
|---|---|---|---|
| IV | 2.28 | 2.35 | 2.88 |
| $I_2$ | | 0.85 | 0.37 |
| $I_{10}$ | | 11.37 | 4.95 |
| Ash, percent | 0.60 | 0.22 | 0.02 |
| Diluent, percent | *16 | 0.08 | 0.16 |
| KF, percent | | 0.06 | 0.50 |

* Heptane as received; dried to a 6% content prior to extrusion.

The samples were extruded according to the procedures of Example 1. Samples B-2 and C-2 did not produce foams. Sample A-2 produced a uniformly dispersed fine cell foam with no evidence of collapse.

EXAMPLE 3

A polyethylene having the same analysis as Sample C-2 (Example 2) was extruded under the conditions of Example 1, after being compounded to have the following composition:

100 parts polyethylene (stabilized with 0.1% substituted phenolic primary anti-oxidant and 0.25% of a secondary anti-oxidant dilaurylthiodipropionate)
.25 part calcium silicate
.25 part zinc stearate
.15 part propylene oxide A mixture of 7½ parts of Freon 12 and 3½ parts of heptane was injected into the extruder in increasing amounts until a fine cell foam of 2.5 pounds per foot$^3$ was obtained.

EXAMPLE 4

A polyethylene having the same analysis as Sample C–2 (Example 2) was extruded under the conditions of Example 1, after being compounded to have the following compositions:

100 parts polyethylene (stabilized as in Example 3)
.25 part Celogen OT, which is p,p$^1$-oxybis (benzenesulfonyl hydrazide)
.25 part zinc stearate
.15 part propylene oxide A mixture of 7½ parts of Freon 12 and 3½ parts of heptane was injected into the extruder in increasing amounts until a foam of 2.2 pounds per foot$^3$ was obtained. The cells of the resulting foam were smaller than the cells of the foam of Example 3 and well distributed.

EXAMPLE 5

A polyethylene having the analysis of Sample B–2 (Example 3) was extruded under the conditions of Example 1 after being compounded to have the following composition:

100 parts polyethylene (stabilized as in Example 3)
.25 part zinc stearate
.15 part propylene oxide A mixture of 7½ parts of Freon 12 and 3½ parts of heptane was injected into the extruder in increasing amounts until a foam of 2.4 pounds per foot$^3$ was obtained. The cell size of the foam was substantially smaller and more evenly distributed than that of Examples 3 and 4.

EXAMPLE 6

Example 5 was repeated except that there was incorporated into the composition 0.25 part of Celogen OT, which is p,p$^1$-oxybis (benzenesulfonyl hydrazide). The cell size of the foam obtained was much smaller than that of Example 4 or 5.

EXAMPLE 7

Example 5 was repeated except the polyethylene had 6% of the polymerization solvent (heptane) remaining therein and no Freon was added during extrusion. The cell size was somewhat larger than that of Example 5 but uniform.

EXAMPLE 8

Example 7 was repeated except the polyethylene had 3½% of the polymerization solvent (heptane) remaining therein and 7½% Freon was also injected into the extruder and the resulting foam cells were smaller and more uniform than in Example 5.

As will be appreciated from the above disclosures, the objects of the invention have been obtained. Further, it will be understood that various modifications of the invention may be made within the purview thereof. These modifications are therefore intended to be included within the spirit and scope of the following claims.

What is claimed is:

1. In a process for producing a foamed polyolefin wherein the said polyolefin is the product of polymerization of an olefin in the presence of a polymerization solvent and an organo-metallic polymerization catalyst and wherein the polyolefin is foamed with a blowing agent and a nucleating agent, the improvement comprising utilizing a nucleating agent which is at least in part the catalyst residue associated with the polyolefin after polymerization, said catalyst residue being the residue from the treatment of said organo-metallic polymerization catalyst with a basic solution to neutralize said catalyst and being present in the amount of at least 0.07%, calculated as ash percent.

2. The process of claim 1 wherein the basic solution contains hydroxides of the group selected from the alkali metals and alkaline earths.

3. The process of claim 1 wherein the blowing agent is at least in part the polymerization solvent for the said polyolefin which has not been separated from the polyolefin after polymerization thereof.

4. The process of claim 3 wherein the solvent is present in amounts of from about 1% to 6% by weight of the polyolefin.

5. The process of claim 1 wherein the polyolefin is a polymer of a lower olefin having from 2 to 10 carbon atoms.

6. The process of claim 5 wherein the said olefin is selected from the group consisting of ethylene, propylene, and 1-butene.

7. The process of claim 1 wherein said catalyst residue is present in the amounts of from about 0.07% to 0.6%, calculated as an ash percent.

8. A process for producing a uniformly dispersed, small cell foam comprising: polymerizing an olefin in the presence of a polymerization solvent and an organo-metallic polymerization catalyst, deactivating said catalyst by treating the polymerization mixture with a basic solution to neutralize said catalyst, recovering solid particles of polyolefins containing inert catalyst residue therein, said inert catalyst residue being present in the amount of at least 0.07%, calculated as ash percent and heating said solid particles of polyolefins in at least the presence of a blowing agent.

9. The process of claim 8 wherein the basic solution contains hydroxides of the group selected from the alkali metals and alkaline earths.

10. The process of claim 8 wherein the blowing agent is at least in part the polymerization solvent for the said polyolefin which has not been separated from the polyolefin after polymerization thereof.

11. The process of claim 10 wherein the solvent is present in amounts of from about 1% to 6% by weight of the polyolefin.

12. The process of claim 8 wherein said inert catalyst residue is present in the amounts of from about 0.07% to 0.6%, calculated as an ash percent.

References Cited

UNITED STATES PATENTS

| | | | |
|---|---|---|---|
| 2,957,859 | 10/1960 | Mertes | 260—2.5 |
| 3,275,577 | 9/1966 | Hoeg et al. | 260—94.9 G–7 |
| 3,330,785 | 7/1967 | Boyd | 260—2.5 |
| 3,485,774 | 12/1969 | McKenica | 260—2.5 E |

SAMUEL H. BLECH, Primary Examiner

W. J. BRIGGS, SR., Assistant Examiner

U.S. Cl. X.R.

260—2.5 E, 23 H, 31.8, 33.6 UA, 45.7 P, 94.9 B, 94.9 GD; 264—53